May 15, 1945. W. R. VOSPER 2,376,021
ADJUSTABLE REAMER
Filed March 29, 1943
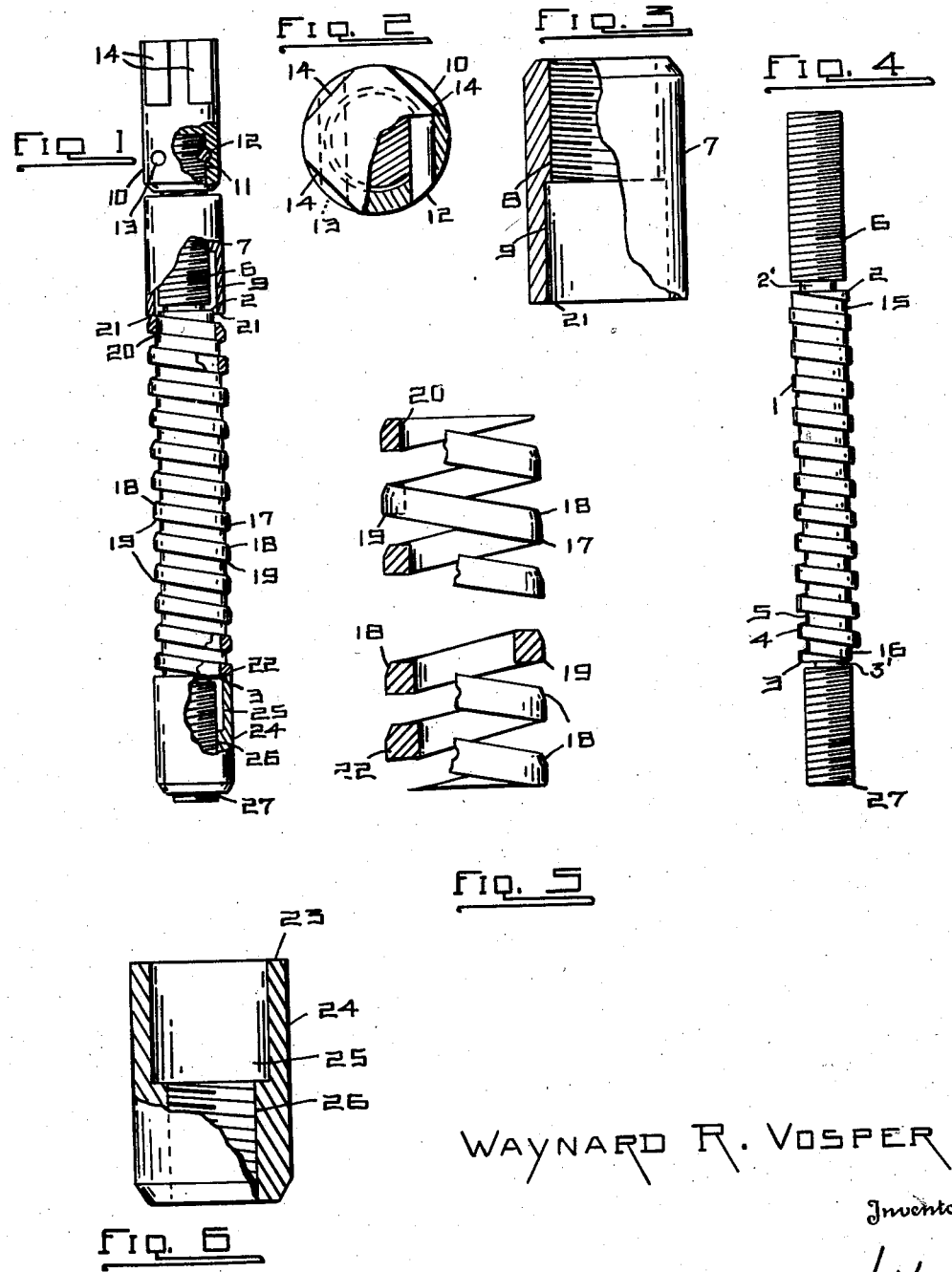
WAYNARD R. VOSPER
Inventor Patented May 15, 1945

2,376,021

UNITED STATES PATENT OFFICE 2,376,021

ADJUSTABLE REAMER

Waynard R. Vosper, Toledo, Ohio

Application March 29, 1943, Serial No. 480,898

4 Claims. (Cl. 77—75)

This invention relates to annular cutting tools, more especially for maintained accuracy.

This invention has utility when incorporated in full pitch extent expansible cutting edge helix for reamers.

Referring to the drawing:

Fig. 1 is a side elevation, with parts broken away, of an embodiment of the invention in a helix unit adjustable reamer;

Fig. 2 is a plan and partial section view of the operating head for the tool of Fig. 1;

Fig. 3 is a side view, partly broken away, of the adjustable nut or sleeve adjacent the head for the tool of Fig. 1;

Fig. 4 is the helical-seat-providing core to be anchored with the head of Fig. 2 after the nut of Fig. 3 is positioned thereon; portions of the core being broken away;

Fig. 5 is the cutting-edge-providing helix unit, portions thereof being broken away, said unit having a seat complementary to that of the core for threading adjustment therealong; and Fig. 6 is a part section and the balance side elevation view of opposing adjusting and holding nut to engage the core and lock the cutting helix for its other terminus to engage the nut of Fig. 3.

The embodiment of the invention herewith disclosed includes a cylindrical core 1 having upper shoulder 2 spaced by a reduced diameter portion 2' from the upper terminal threading, and with a reduced diameter portion 3' extending from a lower shoulder 3. Continuous between these shoulders 2, 3, the core 1 has a helical rib 4 for a seat or support 5. While in the showing herewith, there is but one thread or seat 5, it is within the scope of the invention that there may be plural threads or seats. The consideration of importance is the arc continuity, which it is desired to have approximate, or more desirably, exceed 360°.

The core 1, in its extent away from the shoulder 2, has externally threaded portion 6. A nut or sleeve 7 has an internally threaded portion 8 adapted for rotative engagement with the threaded portion 6. In this assembly, larger internal diameter sleeve portion 9 is directed toward the shoulder 2. This sleeve portion 9 in its movement along the core 1 is adapted to ride clear of the rib 4. The terminal portion of the core 1, projecting from the nut 7 oppositely from the shoulder 2, may now have mounted thereon a head 10. To seat with the threading 6, the head 10 may have internal threading 11, similar to the threading 8 of the nut 7. The recess in the head 10 for the threading 11 may be say about half the length of the head 10. The head 10 and core 1, thus assembled, may be anchored by drilling, and then driving keys 12, 13, therethru, and finishing off to flush peripheral extent. Faced off or flat portions 14 at the head, away from the direction of the core 1, provide ready means for chuck or grip to operate to turn the core, whether in a machine tool, a portable power tool, or even hand tool.

The seat 5 provides full circumferential continuity support. As herein shown, the seat 5 adjacent the shoulder 2 has shallow portion 15 continuous and gradually deepening to major depth portion 16 adjacent the shoulder 3. It is thus seen that the root of the square thread seat 5 is of gradually lessening radius from the shoulder 2 toward the shoulder 3. Conversely, there is no constant diameter for the seat 5, but one progressively increasing from the shoulder 3 toward the shoulder 2.

Somewhat like a helical coil spring, complementary helix unit or member 17 has chamfer or taper portion 18 opposite cutting edge 19 on its outer or peripheral continuity portion. Thinner portion 20 may be introduced into the seat 16 and turned to travel along the seat toward the portion 15 to abut end 21 of the sleeve 7. The member 17 is of gradually increasing gage from portion 20, to a portion 22.

The cutting edge providing member 17 has sufficient resilience to adapt to the seat 5 in its progress along the core 1. The core seat 5 thus provides thruout a rigid continuous support for opposing stresses met at the cutting edge 19. The closeness of register for the helix 17 in the seat 5 means that the rib 4 is an effective holding against any chatter or vibration of the cutting edge as to the core. The positioning of the strip member 17 in the seat 5 is completed by having its heavier terminal portion 22 abutted by end 23 of a sleeve nut 24 having internal clearance portion 25 to ride over the core rib 4 from the shoulder 3. From the recess or clearance portion 25, the sleeve-nut 24 has an internally threaded portion 26 to engage externally threaded portion 27 on the core 1 as extending away from the shoulder 3.

By establishing circular accuracy for the cutting edge 19 and the complementary seat 5 for the member 17, reliable working results are readily possible of achievement. Minute variations to meet special conditions or fitting, or to come to most close tolerances, are within the range of ready adjustment hereunder. For increasing the diameter sought to be cut by the reamer in a hole, the nut 7 may be backed off slightly from the member 17 or toward the head 16. The nut 24 may then be urged to push the member 17. The firm holding of the helix 17 by the core 1 may in some instances require special manipulation to effect the desired twist in urging the member 17 to its new position. A sample of test cutting should locate the member 17 to be locked by the nut 24, and even tightening of the nut 7. Of course, to decrease the desired reaming diameter, the converse direction is undertaken for moving the member 17; that is away from the shoulder 2 and toward the shoulder 3.

Considered from the differential relation between the threading of greater pitch and different in direction for the core seat 5 than for the threadings 6, 27, there is a vernier range of relative positioning. This means a magnified movement for the adjustment shifted nut and is adaptable to fine calibration under such scale conditions as may conform to the work at hand.

What is claimed and it is desired to secure by Letters Patent is:

1. An adjustable reamer comprising a core providing an approximately constant pitch progressively less depth helical seat portion, threaded end portions on the core spaced from said seat by reduced intermediate portions, the threads on said end portions running in a direction opposite to that of said helical seat portion, a complementary cutting member helix adapted to enter said seat portion, and opposing stop collars threaded upon said end portions and each having a sleeve portion extending towards and adapted to overhang the adjacent intermediate portion, upon rotary adjustment of the collar, thereby to abut the member to lock the member against shifting as to the seat portion.

2. An adjustable reamer comprising a core having therealong in sequence a threaded portion, a first reduced intermediate portion, a helical seat, a second reduced intermediate portion and an additional threaded portion, said seat having a root tapering from one reduced intermediate portion toward the other, a complementary helical cutting member of greater than one circumference extent located in said seat, and a stop member threaded upon each of said threaded portions and each having a sleeve portion extending towards and adapted to overhang the adjacent intermediate portion and seat, upon rotary adjustment of the collar, thereby to abut the member and positively locate the member against shifting in its seat.

3. An adjustable reamer helical cutting member terminally tapering to flat end portions in parallel planes perpendicular to its axis, the inner face of the member being of progressively less diameter, a core, a complementary helical seat thereon for the helical cutting member, threaded end portions on the core spaced from said seat by reduced intermediate portions and a sleeve on each threaded end portion extending over the adjacent intermediate portion and abutting the flat ends of the cutting member.

4. An adjustable reamer cutting member comprising a flat ended helix of progressively increasing radial thickness and of approximately constant pitch, a supporting core having a complementary helical seat having its greater depth portions at the greater thickness region of the member, threaded end portions on the core spaced from said seat by reduced intermediate portions, the threads on said end portions running in a direction opposite to that of the helical seat, and a sleeve threaded on each end portion extending over the adjacent intermediate portion to abut the flat ends respectively of the helix.

WAYNARD R. VOSPER.